United States Patent [19]
Mine

[11] Patent Number: 5,515,277
[45] Date of Patent: May 7, 1996

[54] METHOD AND SYSTEM FOR CONTROLLING ACTIVE SUSPENSIONS OF A VEHICLE DURING ACCELERATION AND DECELERATION

[75] Inventor: Atsushi Mine, Ashikaga, Japan

[73] Assignee: Fuji Jukogyo Kabushiki Kaisha, Tokyo, Japan

[21] Appl. No.: 358,547

[22] Filed: Dec. 14, 1994

Related U.S. Application Data

[63] Continuation of Ser. No. 791,851, Nov. 14, 1991, abandoned.

[30] Foreign Application Priority Data

Nov. 29, 1990 [JP] Japan .................. 2-332226
Mar. 28, 1991 [JP] Japan .................. 3-089477

[51] Int. Cl.$^6$ .................................................... B60G 17/01
[52] U.S. Cl. .................................... 364/424.05; 280/707
[58] Field of Search ................ 364/424.05; 280/707, 280/840, 6.1, 6.12

[56] References Cited

U.S. PATENT DOCUMENTS

| | | | |
|---|---|---|---|
| 4,856,798 | 8/1989 | Buma et al. | 280/707 X |
| 4,948,166 | 8/1990 | Kaneko | 280/707 |
| 5,013,067 | 5/1991 | Mine et al. | 280/840 |
| 5,029,328 | 7/1991 | Kamimura et al. | 364/424.05 |
| 5,029,892 | 7/1991 | Miwa | 280/707 |
| 5,033,770 | 7/1991 | Kamimura et al. | 280/707 |
| 5,042,833 | 8/1991 | Kawabata | 280/707 |
| 5,044,661 | 9/1991 | Kawabata | 280/707 |
| 5,044,662 | 9/1991 | Kawabata | 280/707 |
| 5,090,727 | 2/1992 | Kii et al. | 280/707 |
| 5,159,554 | 10/1992 | Buma et al. | 364/424.05 |

FOREIGN PATENT DOCUMENTS 0114757 8/1984 European Pat. Off. .
2-95911 4/1990 Japan .

Primary Examiner—Collin W. Park
Attorney, Agent, or Firm—Beveridge, DeGrandi, Weilacher & Young

[57] ABSTRACT

An active suspension system of a vehicle has a feed back control system for controlling four suspensions for the four wheels to maintain a reference vehicle height responsive to detected vertical relative displacements between the wheels and the vehicle body at said suspensions, and a feed forward control system for controlling the suspension to reduce pitching of the vehicle responsive to detected longitudinal acceleration. There is further provided a circuit for changing the reference vehicle height which is responsive to the absolute value of the detected longitudinal acceleration or deceleration for reducing the reference vehicle height with increase of the absolute value so that the vehicle body is lowered while the pitching is maintained at a predetermined value so as to obtain better driver's sensation during vehicle acceleration and deceleration and to improve the performance of acceleration and deceleration.

10 Claims, 6 Drawing Sheets

METHOD AND SYSTEM FOR CONTROLLING ACTIVE SUSPENSIONS OF A VEHICLE DURING ACCELERATION AND DECELERATION

This application is a continuation of application Ser. No. 07/791,851, filed Nov. 14, 1991 now abandoned, which application is entirely incorporated herein by reference.

BACKGROUND OF THE INVENTION

The present invention relates to a method and a system for controlling active suspensions of a vehicle.

A known active suspension system of a vehicle comprises suspensions into and out of which fluid is charged and discharged independently to maintain a reference vehicle height by extending and contracting the suspensions responsive to vertical relative displacements between the wheels and the vehicle body at the positions of the respective suspensions.

Japanese Patent Application Laid-Open Pub. No. 2-95,911 discloses an active suspension system as described above wherein there are provided a longitudinal G-sensor for detecting longitudinal acceleration and a lateral G-sensor for detecting lateral acceleration applied to the vehicle. In the system, pitching and rolling motions of the vehicle are preestimated responsive to the longitudinal and lateral accelerations detected during acceleration, deceleration and turning of the vehicle. The preestimation is performed by charging and discharging quantities of the fluid into and out of the respective suspensions to suppress pitching and rolling of the vehicle.

The active suspension system described above has a feed back control system for controlling the suspensions so as to maintain a reference vehicle height responsive to relative vertical displacements between the respective wheels and the vehicle body. The active suspension system has, in addition to the feed back control system, a feed forward control system for maintaining preestimated vehicle rolling and pitching responsive to longitudinal and lateral accelerations detected during vehicle acceleration, deceleration and turning. By combining the feed forward control system with the feed back control system, the attitude of the vehicle is maintained at a desired attitude without delay.

However, the known active suspension system described above has a disadvantage in that in the case of abrupt braking the driver is caused to feel an unnatural feeling or sensation of being pressed from the forward side because the front part of the vehicle is not lowered even in the event of abrupt braking.

SUMMARY OF THE INVENTION

It is an object of the present invention to eliminate the disadvantage mentioned above and to provide a method and a system for controlling active suspensions of a vehicle which gives the driver a comfortable sensation during acceleration and deceleration.

According to an aspect of the present invention, there is provided a method for controlling active suspensions of a vehicle, comprising the steps of detecting vertical relative displacements between a vehicle body and respective wheels of the vehicle, controlling charging and discharging of fluid into and out of respective fluid suspensions for the respective wheels to extend and contract the suspensions independently so as to maintain the suspensions at a reference vehicle height, detecting longitudinal acceleration being applied to the vehicle, and controlling said charging and discharging of the fluid so as to maintain pitching of the vehicle at a predetermined value during acceleration and deceleration, said method comprising the steps of reducing the reference vehicle height, as the absolute value of the detected longitudinal acceleration increases, and lowering the vehicle body while maintaining the pitching of the vehicle at said predetermined value.

According to another aspect of the present invention, there is provided a system for controlling active suspensions of a vehicle, comprising fluid suspensions provided for respective wheels, means for charging and discharging fluid into and out of the respective fluid suspensions to extend and contract the suspensions independently, suspension stroke sensors provided for the respective wheels to detect vertical relative displacements between a vehicle body and the respective wheels, feed back control means responsive to the relative displacements detected by the suspension stroke sensors for independently controlling said means for charging and discharging so as to maintain said suspensions to have a reference vehicle height, a longitudinal G-sensor for detecting longitudinal acceleration applied to the vehicle, and feed forward control means responsive to the longitudinal acceleration for independently controlling said means for charging and discharging so as to maintain pitching of the vehicle at a predetermined value during acceleration and deceleration, said system comprising means responsive to the detected longitudinal acceleration for changing the reference vehicle height, said changing means supplying an output thereof to said feed back control means so as to reduce the reference vehicle height as the absolute value of the longitudinal acceleration increases, to lower the vehicle body while suppressing or reducing the pitching of the vehicle at said predetermined value.

According to the present invention, the larger the longitudinal acceleration during acceleration and deceleration of a vehicle, the more is lowered the vehicle body, so that the driver does not feel to be pressed from the forward side. Especially, as the deceleration becomes larger during braking, the vehicle body is lowered more so that the center of gravity of the vehicle is lowered. As a result, longitudinal load shift quantity is reduced, and variation in the ground reaction force of the wheels becomes smaller than in the prior art. Therefore, the maximum permissible longitudinal acceleration during braking is increased with resultant improvement of the braking performance.

Preferred embodiments of the present invention will become understood from the following detailed description referring to the accompanying drawings.

DESCRIPTION OF THE PREFERRED EMBODIMENTS

Figure 1:
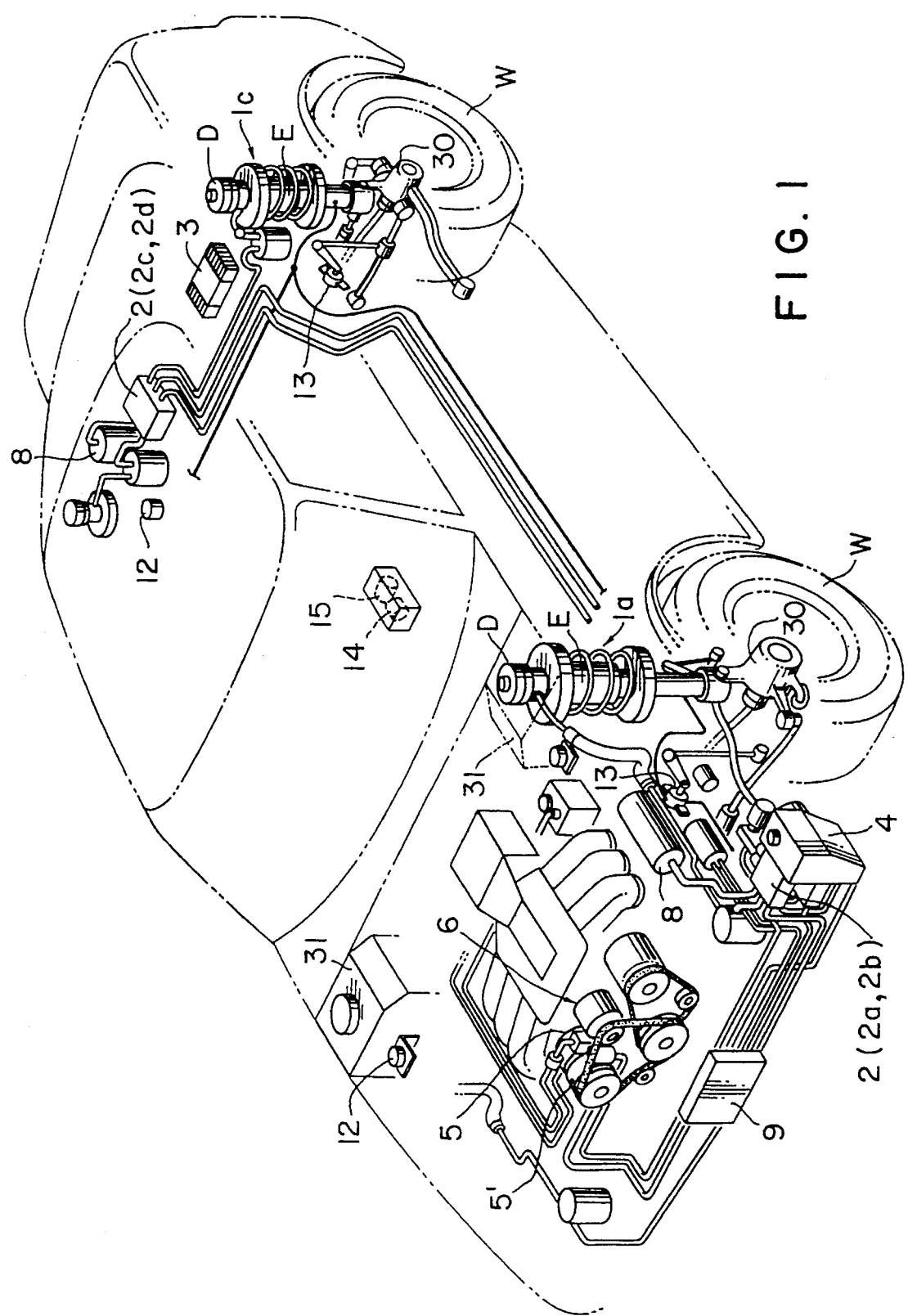
FIG. 1 is a schematic perspective view of a motor vehicle showing a layout of a system for controlling active suspensions according to the present invention.
Figure 2:
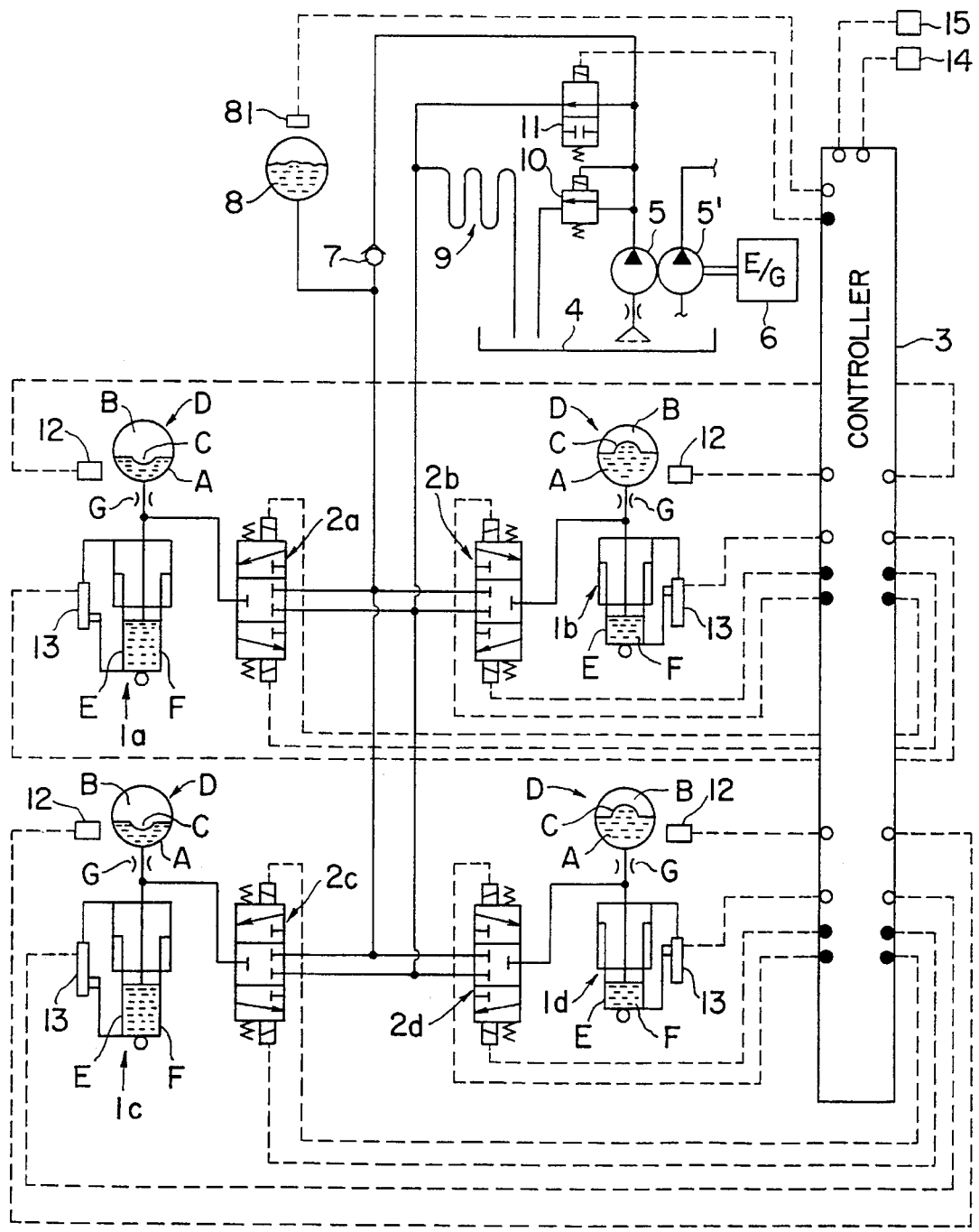
FIG. 2 is a diagram showing a hydraulic system for suspensions used in the present invention.

FIGS. 1 and 2 show an active suspension system to which the present invention is applied. In FIG. 2, reference characters 1a and 1b indicate suspensions of left and right front wheels of a motor vehicle, and 1c and 1d indicate suspensions of left and right rear wheels. Each of the suspensions 1a, 1b, 1c and 1d is provided with a pneumatic chamber D and a hydraulic cylinder E. The chamber D has an oil chamber A and an air chamber B which are divided by a diaphragm C. The oil chamber A of the chamber D and an oil chamber F of the hydraulic cylinder E are communicated through an orifice G. As shown in FIG. 1, one end of the hydraulic cylinder E (i.e., a bottom portion of the cylinder) is connected to a suspension arm member 30 on the vehicle wheel W, and the other end (a piston rod) of the hydraulic cylinder E is connected to a member 31 of a vehicle chassis. In accordance with the load on the cylinder E, hydraulic oil in the oil chamber F flows into and out of the oil chamber A through the orifice G so as to generate an appropriate damping force and at the same time to produce a spring action by the volumetric elasticity of the air sealed in the air chamber B. The system described above is a known hydropneumatic suspension system.

There are provided control valves 2a, 2b, 2c and 2d that supply and discharge oil to and from the oil chamber F of the hydraulic cylinders E. The control valves 2a, 2b, 2c and 2d are operated independently by a valve drive signal from a controller 3. In FIG. 1, the control valves 2a, 2b, 2c and 2d are installed separately in two groups for the front and rear suspensions.

An oil pump 5 is driven by an engine 6 to feed oil from an oil reservoir 4 to the system. An oil pump 5' for power steering and the oil pump 5 are driven by the engine 6.

The oil discharged from the oil pump 5 passes through a check valve 7 and is stored in a high-pressure accumulator 8. In FIG. 1, the accumulator 8 is divided into two sections for the front and rear suspensions. When some of the control valves 2a, 2b, 2c and 2d are switched to the intake side, high-pressure oil is supplied through the control valves that have been switched to the intake side, i.e., to the oil chamber F of the suspensions 1a, 1b, 1c and 1d. When some of the control valves 2a, 2b, 2c and 2d are switched to the discharge side, oil is discharged from the oil chambers F of the suspensions 1a, 1b, 1c and 1d and the oil passes through an oil cooler 9 to flow into the oil reservoir 4.

FIG. 2 shows a relief valve 10 and a loading/unloading valve 11. The valve 11 is switched to the unload state as indicated in FIG. 2, when signals generated from the controller 3 responsive to signals from a pressure sensor 81 indicate that the high-pressure accumulator 8 has attained a predetermined pressure. When the valve 11 is switched to the unload side, the oil discharged from the oil pump 5 flows to the oil cooler 9 and then into the oil reservoir 4.

The suspensions 1a, 1b, 1c and 1d are provided with suspension stroke sensors 13 as shown in FIGS. 1 and 2. The sensor 13 detects vertical relative displacement for each suspension between the wheel and the vehicle body and input the information of the relative displacement for each of the suspensions 1a, 1b, 1c and 1d to the controller 3.

In order to detect behaviors of the vehicle, there are provided a vertical G-sensor 12 to detect vehicle vertical acceleration (vertical G), a lateral G-sensor 15 to detect vehicle lateral acceleration (lateral G) and a longitudinal G-sensor 14 to detect vehicle longitudinal acceleration (longitudinal G). For example, the lateral G-sensor 15 derives lateral acceleration based upon signals from a vehicle speed sensor and a steering angle sensor. Or the lateral acceleration is computed from detected steering torque and steering assisting force etc. FIG. 1 shows the positions where the G-sensors 12, 14 and 15 are installed. Signals of the sensors 12, 13, 14 and 15 are inputted to the controller 3. Responsive to the signals, the controller 3 determines control quantity of charge and discharge of oil for each suspension to send valve driving signals to the respective control valves 2a, 2b, 2c and 2d, as will be described below with reference to FIG. 3.

Figure 3:
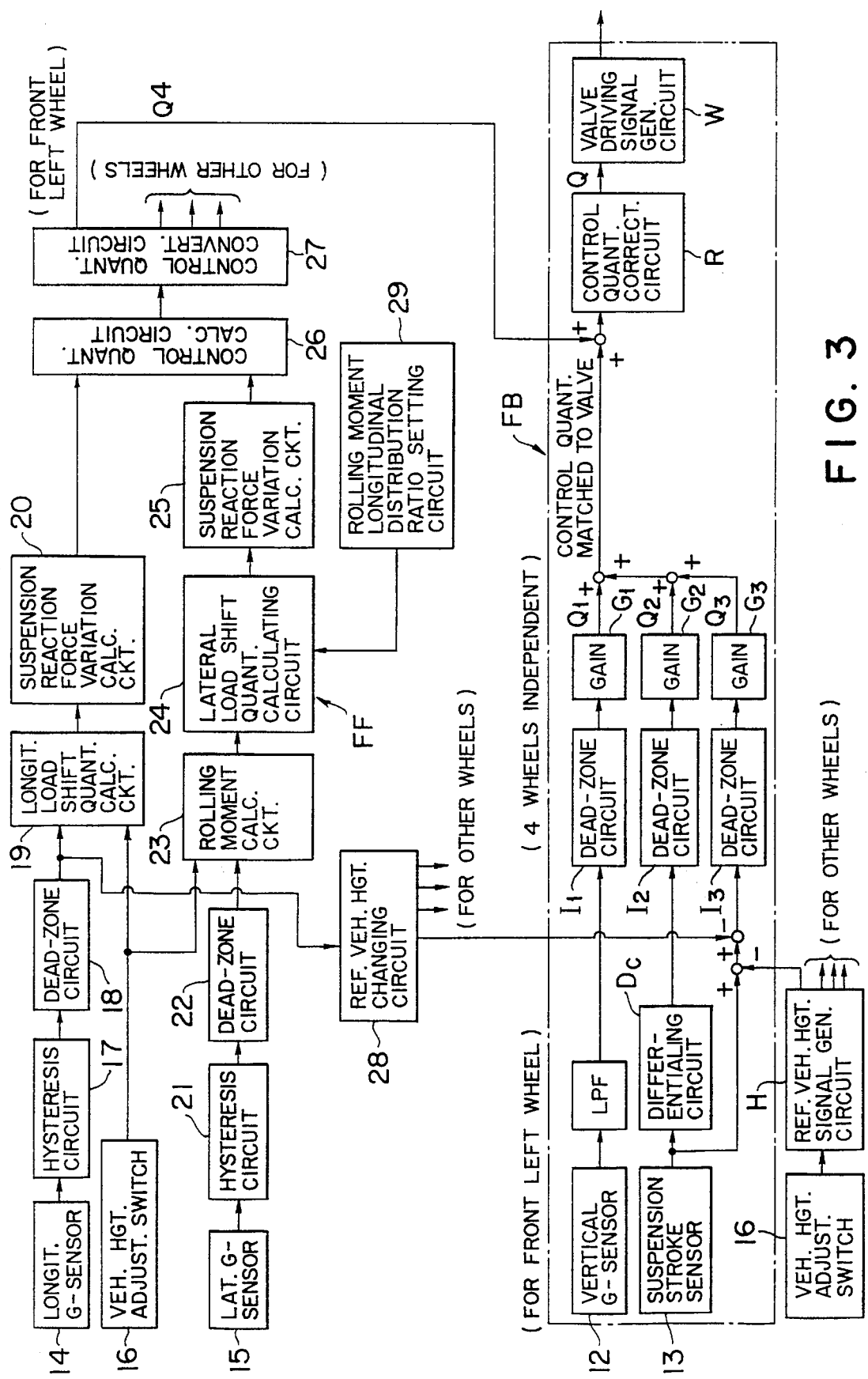
FIG. 3 is a block diagram of the system according to the present invention.

In FIG. 3, the portion enclosed by a chain line FB is a feed back control system for one of four suspensions 1a, 1b, 1c and 1d, for example, the suspension 1a of the left front wheel. While not shown in FIG. 3, four sets of the same control system are provided for independently controlling the respective suspensions 1a, 1b, 1c and 1d.

In each suspension unit, the vertical acceleration and the vertical relative displacement (stroke) are respectively detected by the sensors 12 and 13. The vertical acceleration signal from the vertical G-sensor 12 is passed through a low-pass filter LPF to reduce its high-frequency component. The signal is then passed through a dead-zone circuit $I_1$ to remove a signal of a set range in the vicinity of zero. The resulting signal is subjected to multiplication by a gain circuit $G_1$. Thus a control command quantity $Q_1$ matched to the characteristics of the corresponding control valve 2a, 2b, 2c or 2d is obtained.

The vertical relative displacement or the stroke signal from the stroke sensor 13 is inputted to a differentiating circuit Dc and a dead-zone circuit $I_3$. The signal passing through the differentiating circuit Dc is converted into a vertical relative displacement or a stroke speed signal. The speed signal passes through a dead-zone circuit $I_2$, which removes therefrom a signal fraction within a set zone in the vicinity of zero. The resulting signal is passed through a gain circuit $G_2$ to become a control command quantity $Q_2$ matched to the corresponding control valve characteristics.

By setting a vehicle height adjusting switch 16, a reference vehicle height signal is generated from a reference vehicle height generating circuit H. The reference vehicle height signal is subtracted from the vertical relative displacement signal to be inputted to the dead-zone circuit $I_3$, and an actual relative displacement signal is obtained. The actual relative displacement signal is passed through the dead-zone circuit $I_3$, where a signal fraction within a set zone in the vicinity of zero is removed therefrom. The resulting signal is passed through a gain circuit $G_3$ to become a control command quantity $Q_3$ matched to the corresponding control valve characteristic.

The control command quantity ($Q_1$, $Q_2$, and $Q_3$) matched to the characteristics of the corresponding control valve is as follows. In the case where the control valve is a flow rate control valve, the control command quantity is the length of opening time or opening degree of the valve, necessary to obtain a required quantity of hydraulic oil to be charged or discharged. The length of the valve opening time or the valve opening degree is determined depending upon the valve opening-closing characteristics.

The three control command quantities $Q_1$, $Q_2$, and $Q_3$ are added as shown. The resulting sum of the quantities is passed through a control quantity correction circuit R to be converted into a corrected command quantity Q corrected according to environmental conditions such as temperature and pressure loss due to the length of piping. The corrected quantity Q is passed through a valve driving signal generating circuit W, which thereupon generates a control valve opening/closing signal. Thus, the control valve 2a is switched to the oil charging side or the discharge side. As a result, charging or discharging of oil of the command quantity into or out of the suspension 1a is accomplished.

In the control operation described above, when vertical acceleration is detected, oil within the suspension 1a is discharged responsive to upward acceleration. For downward acceleration, the oil is charged into the suspension 1a. Soft and high-attenuation suspension characteristics are created by such control operation, with respect to forces from below such as a bump or thrust from the road surface. With respect to forces from above (i.e., from the vehicle body), apparently hard suspension characteristics are created so as to maintain the vehicle height at the reference vehicle height due to the control responsive to the vertical stroke speed and the vertical stroke, by controlling the charge and discharge of the oil.

Furthermore, the control system does not react to vibrations in the high-frequency region in resonance of the mass below the suspensions by passing the vertical acceleration signal through the low-pass filter LPF but responds to vibrations of low-frequency region in resonance of the mass above the suspensions. Accordingly, the control system can avoid bouncing so as to improve the driveability, thus preventing waste of energy for the control system.

The vehicle height adjusting switch 16 is a change-over switch for changing over between normal vehicle height to high vehicle height. When normal vehicle height is selected, the reference vehicle height signal generating circuit H generates a low reference vehicle height signal. When the vehicle height adjusting switch 16 is changed over to the side of the high vehicle height, the reference vehicle height signal generating circuit H generates a high reference vehicle height signal.

The control system responsive to the vertical stroke signal from the sensor 13 functions to maintain the vehicle height at the reference vehicle height. Therefore, when the reference vehicle height is switched from the normal reference vehicle height to the high reference vehicle height, the control command quantity $Q_3$ is generated for charging the oil. Thus the oil is charged into the suspension 1a thereby to raise the vehicle height at the high reference vehicle height. When the vehicle height adjusting switch 16 is returned to the side of the normal vehicle height, the control command quantity $Q_3$ is generated for oil discharge. Thus, the oil within the suspension 1a is discharged. As a consequence, the vehicle height is lowered to the normal reference vehicle height. The vehicle height control can be carried out in three heights or more or continuously without steps. The discharging and charging of oil are simultaneously carried out for all the suspensions by the switching operation of the wheel height adjusting switch 16.

In addition to the control in the state of normal driving state, control is necessary also when a large acceleration is suddenly applied in the longitudinal direction or the lateral direction of the vehicle at the time of sudden braking, abrupt acceleration, or sudden turning. In such a case, prompt and positive control of the vehicle attitude without delay is required. For this purpose, there is provided a feed forward control system FF based on the detection signals from the longitudinal G-sensor 14 and the lateral G-sensor 15.

More specifically, as shown in FIG. 3, the longitudinal acceleration signal detected by the longitudinal G-sensor 14 is passed through, and converted by a hysteresis circuit 17 and a dead-zone circuit 18. By the hysteresis and dead-zone circuits 17 and 18, the longitudinal acceleration signal is converted to attain a control which does not respond to longitudinal G fluctuations of an ordinary order during normal driving but responds to large pitching of the vehicle body at the time of full acceleration or of braking with greater degree than medium. The signal converted is then introduced into a circuit 19 for calculating a longitudinal load shift quantity and into a circuit 28 for changing the reference vehicle height.

The calculating circuit 19 operates to calculate the load shift quantity in the longitudinal direction, responsive to the input signal fed thereinto by previously stored data of vehicle types, and information on the present height of the center of gravity of the vehicle above the ground determined from the vehicle height adjusting switch 16.

The calculated result is transmitted to a calculating circuit 20 for calculating variation of suspension reaction force. The calculating circuit 20 operates to calculate the variation of the suspension reaction force, which may arise from the load shift quantity at each position of the suspension, with consideration of driving force and braking force acting on the tires responsive to the information thus fed thereinto and other information such as the type of the suspensions and the driving type (front-wheel drive, rear-wheel drive, four-wheel drive, etc.).

Similarly, as in the case of the longitudinal G-sensor 14, the lateral acceleration detected by the lateral G-sensor 15 is also passed through a hysteresis circuit 21 and a dead-zone circuit 22. Thus, the control avoids to respond to minute lateral G-fluctuations occurring during normal driving. In this manner, only a signal above a predetermined value is inputted to a circuit 23 for calculating the rolling moment.

Figure 4:
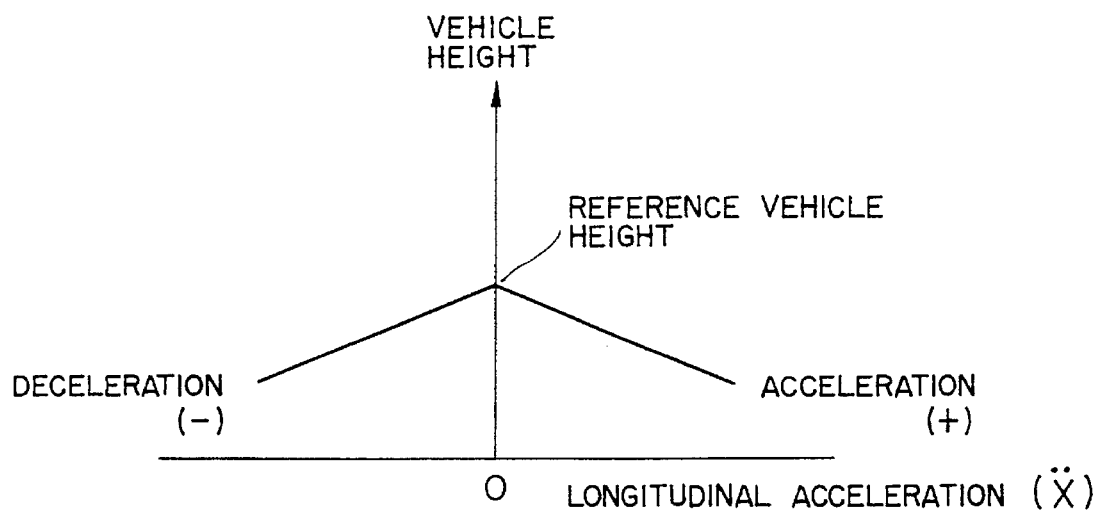
FIG. 4 is a graph indicating a relationship between longitudinal acceleration and reference vehicle height to be changed.

The changing circuit 28 has a function to change the reference vehicle height in accordance with the signal inputted thereto, in a manner indicated in FIG. 4. More specifically, as the absolute value of the inputted signal of the longitudinal acceleration X increases, the value of output signal from the circuit 28 is changed to decrease the reference vehicle height. Forward acceleration is expressed with positive sign (+), and deceleration with negative sign (−). The reference vehicle height is decreased linearly in the case of FIG. 4. The output signal from the circuit 28 is a reference vehicle height changing signal and is used to correct the actual relative displacement signal based on the signal from the suspension stroke sensor 13 and from the reference vehicle height signal generating circuit H, before the relative displacement signal is supplied to the dead-zone circuit $I_3$. The reference vehicle height changing signal is subtracted from the actual relative displacement signal. The correction of the signal is made for the four wheels.

The calculating circuit 23 calculates the rolling moment, on the basis of the vehicle specification previously stored and information on the height of the center of gravity of the vehicle body determined by the vehicle height adjusting switch 16, and on the basis of the inputted lateral acceleration signal. The calculation result is transmitted to a circuit 24 for calculating a lateral load shift quantity.

The calculating circuit 24 operates to distribute the calculated rolling moment to the front and rear wheels and calculates the lateral load shift quantity between the left and right of the front and rear wheels, on the basis of a rolling moment longitudinal distribution ratio determined by a circuit 29 for setting the rolling moment longitudinal distribution ratio.

The resulting output of the calculating circuit 24 is fed to a circuit 25 for calculating the variation of the suspension reaction force. In the calculating circuit 25, the total lateral force acting on the wheels corresponding to the generated lateral G is distributed to the front and rear wheels based on the yaw moment equilibrium equation with the position of the center of gravity of the vehicle and the distance between the front and rear axles. Then, with consideration of the lateral load shift quantity between the front and rear wheels calculated by the calculating circuit 24, the lateral forces on the front and rear wheels, the vehicle height, and the type of the suspensions, the variation of the suspension reaction force is calculated separately for each of the front and rear suspensions.

The variation of the suspension reaction forces calculated by the calculating circuits 20 and 25 are added in a circuit 26 for calculating control quantity. The total variation of the suspension reaction force is determined for each suspension. Furthermore, the control quantity of charge and discharge of the oil matches with the total variation of the suspension reaction force for maintaining the internal pressure of each suspension. The resulting control quantity is converted into a control command quantity $Q_4$ matching with the valve specification or characteristics in a circuit 27 for converting control quantity. The converted control command quantity $Q_4$ is added to the control command quantities $Q_1$, $Q_2$, and $Q_3$. The resulting quantity is fed into a circuit R for correcting the control quantity.

When a longitudinal acceleration or a lateral acceleration is applied to a vehicle, a load shift is produced longitudinally or laterally, respectively, based on the acceleration. As a result, there occurs a vehicle attitude change in the direction of pitching, such as a nose dive or squat, and a vehicle attitude change in the direction of rolling. Therefore, a delay in controlling the vehicle attitude tends to occur if a normal feed back control is used wherein the vehicle attitude is controlled to become a normal attitude responsive to signals from a suspension stroke sensor, which detects suspension stroke changes due to longitudinal and lateral accelerations. Especially, when relatively large longitudinal or lateral acceleration is applied to the vehicle suddenly for a very short time, a delay in attitude control cannot be avoided so that the vehicle will once change in attitude and thereafter recover the normal attitude.

The delay in attitude control can be made remarkably small with precise vehicle attitude control if a feed forward control is used in addition to the feed back control. Such feed forward control comprises detecting longitudinal and lateral accelerations, calculating load shift quantities based on the detected accelerations, calculating suspension reaction variation to be produced for each suspension with consideration of braking force, driving force and lateral force to be imposed on the wheels depending upon the type of the suspensions and the type of drive, and controlling charge and discharge of oil into and out of each suspension responsive to the calculated suspension reaction variation for each suspension.

However, in the case where a reduction of the delay in control is aimed at by the addition of the feed forward control during acceleration and deceleration of a vehicle, the vehicle will only slightly descend at the front or rear wheels during the acceleration and deceleration so that the driver will feel an unnatural sensation of being pressed from the forward side.

In order to eliminate such an unnatural sensation, the present invention employs a control wherein, as shown in FIG. 4, the reference vehicle height is changed in accordance with the absolute value of the longitudinal acceleration X detected by the longitudinal G-sensor 14 during vehicle acceleration and deceleration, so as to lower the entire vehicle body. By such a control, the vehicle body will be lowered more as the longitudinal acceleration becomes larger in absolute value, while the vehicle body is being maintained in substantially horizontal attitude. The larger the longitudinal acceleration, the larger is the degree of descending of the vehicle body, while the smaller the longitudinal acceleration, the smaller is the degree of descending of the vehicle body. Due to such changes in the degree of lowering of the vehicle body depending upon the longitudinal acceleration, the unnatural sensation of being pressed from the forward side is eliminated.

Furthermore, by reducing the vehicle height depending upon the longitudinal acceleration, the height of the center of gravity of the vehicle above the ground will become smaller as the absolute value of the longitudinal acceleration becomes larger so that the longitudinal load shift quantity will be reduced with resultant reduction in the amount of shift of the ground contact load of the wheels, relative to the case of conventional control. As a result, wheel slip is reduced during acceleration and deceleration on roads including roads having low coefficient of friction, whereby the capability of acceleration and braking of vehicles is improved and the allowable maximum acceleration is increased.

In the active suspension system wherein feed back and feed forward controls are combined to suppress vehicle attitude changes such as a squat and nose dive without delay during acceleration and deceleration, the driver's feel of being pressed from the forward side occurs mainly during abrupt braking. Furthermore, the problem of wheel slip occurs mainly during braking. In view of the above facts, the lowering of the vehicle body may be made depending upon only the deceleration during braking.

Figure 5:
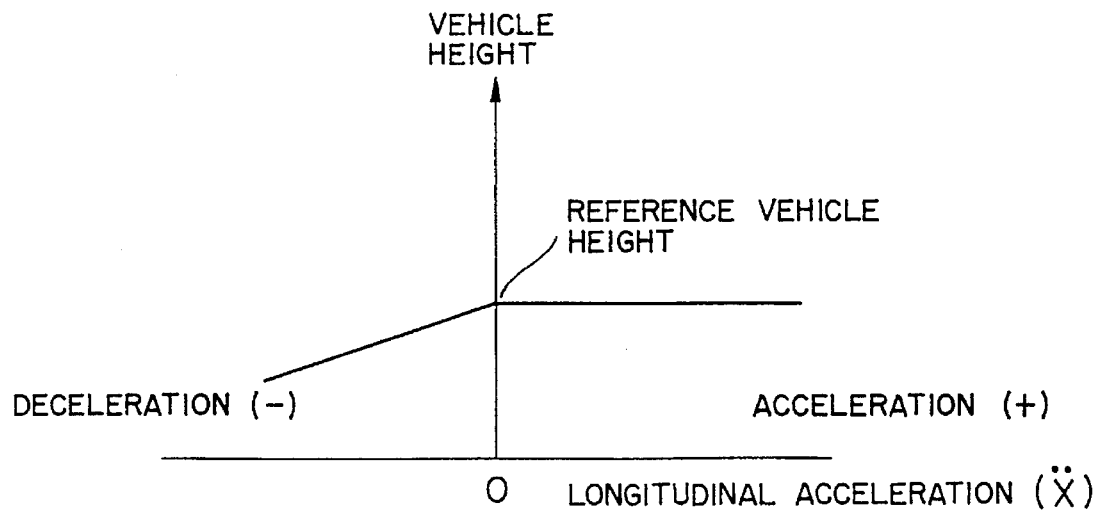
FIG. 5 shows a modified relationship between longitudinal acceleration and reference vehicle height to be changed.

FIG. 5 shows a modified mode of changing the reference vehicle height by the reference vehicle height changing circuit 28 responsive to the signal from the longitudinal G-sensor 14. In the mode shown, the reference vehicle height is reduced as the absolute value of the acceleration having sign (−) (deceleration) increases, while the reference vehicle height is not reduced even when the absolute value of the acceleration having sign (+) increases. In this case, the circuit 19 for calculating the longitudinal load shift quantity and the circuit 20 for calculating the suspension reaction force variation are designed to carry out the calculations in these circuits, taking into consideration the change in the reference vehicle height according to the mode shown in FIG. 5. According to the modified mode, the vehicle body is lowered more during braking as the deceleration becomes larger.

The lateral acceleration detected by the lateral G-sensor 15 may advantageously be subjected to a computation described below.

Figure 6:
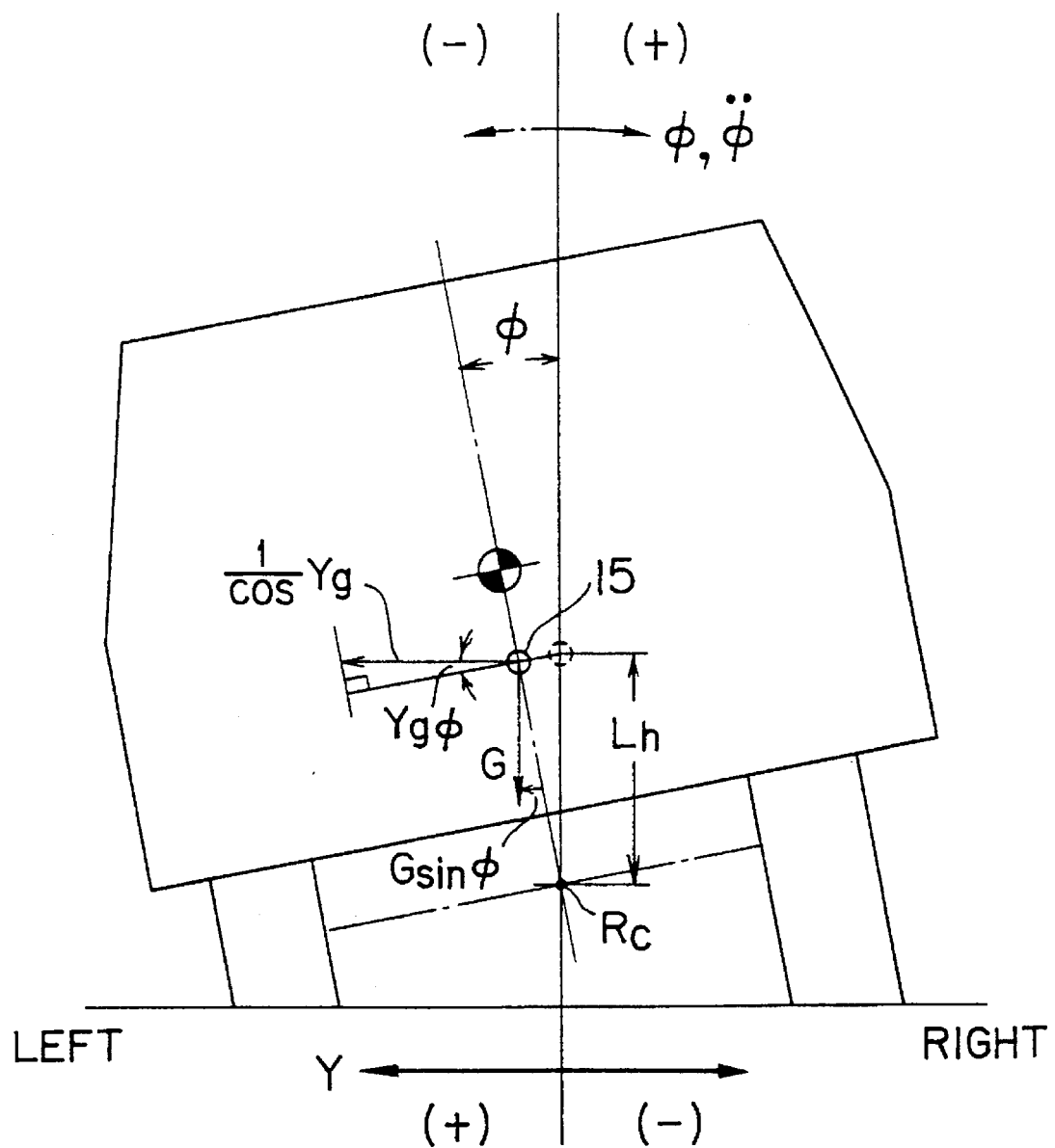
FIG. 6 is a diagrammatic rear view of a vehicle for explaining a nature of lateral acceleration detected by a lateral G-sensor.

FIG. 6 is an elevation of a vehicle provided with a lateral G-sensor 15 as viewed from the rear of the vehicle. The vehicle is shown in a state wherein it is heeled or tilted to the left about its rolling center axis RC. In FIG. 6, various polarities and a dimension are defined as follows. The direction of lateral acceleration is positive toward the left. The rolling angle $\Phi$ is positive in the clockwise direction. The vertical distance between the rolling center axis RC and the installation position of the lateral G-sensor 15 is designated as Lh. The vertical span Lh is positive when the installation position of the lateral G-sensor 15 is above the rolling center axis RC and is negative when the sensor 15 is below the rolling center axis RC.

The leftward heel (rolling angle $-\Phi$) of the vehicle shown in FIG. 6 will be considered to have arisen from driving in a rightward turn of the vehicle. Then, the output of the lateral G-sensor 15, i.e., the quantity Yg of the lateral acceleration detected by the lateral G-sensor 15, is outward (in the leftward direction) relative to the vehicle turn circle and is +Yg. The detected quantity Yg of lateral acceleration is actually a value including a sine component (Gsin$\Phi$) of the gravitational acceleration G arising from the rolling of the vehicle and a rolling oscillation component (product of the rolling angular acceleration and Lh).

Then, fundamentally, the output Yg of the lateral G-sensor 15 is subjected to computation according to Equation (2) below, to become a value Yg' which is exactly a value expressed by the following Equation (1). The value Yg' is suitable for attitude control of the vehicle (feed-forward control) during turning thereof.

$$Yg' = \frac{1}{\cos\Phi} (Yg + G\sin\Phi) + Lh \cdot \ddot{\Phi} \tag{1}$$

wherein $\ddot{\Phi}$ is the rolling angular acceleration.

In the above equation, $$\frac{1}{\cos\Phi}$$

is for the purpose of deriving the horizontal component of the sine component of the lateral G-sensor output and the gravitational acceleration. However, since $\Phi$ is small, this quantity can be expressed as $$\frac{1}{\cos\Phi} \approx 1.$$

Then, the above Equation (1) can be approximated by the following Equation (2).

$$Yg' \approx Yg + G \sin \Phi + Lh \cdot \ddot{\Phi} \tag{2}$$

In the computation according to Equation (2) in the specific example indicated in FIG. 6, the detected lateral acceleration value Yg by the lateral G-sensor 15 is positive and the rolling angle $\Phi$ is negative, so that the rolling angular acceleration is also negative. Therefore, the lateral acceleration value Yg' is a value resulting from removal of the sine component (Gsin$\Phi$) of the gravitational acceleration G and the rolling oscillation component Lh·$\ddot{\Phi}$ at the installation position of the lateral G-sensor 15 from the detected lateral acceleration value Yg.

In the case of a state of rightward rolling due to leftward turning of the vehicle, converse to the state indicated in FIG. 6, the detected lateral acceleration value Yg of the lateral G-sensor 15 is rightward and therefore negative. The rolling angle $\Phi$ is positive, and the rolling angular acceleration is also positive. Therefore, when Yg' is computed by the above Equation (2), it becomes a value resulting from the removal of the sine component Gsin$\Phi$ of the gravitational acceleration G and the rolling oscillation component Lh·$\ddot{\Phi}$ at the installation position of the lateral G-sensor from the detected lateral acceleration value $-$Yg, similarly as described above.

When the lateral acceleration value Yg' determined through the computation as described above is used as a lateral acceleration signal for the control, unnecessary and undesirable control due to spurious lateral acceleration produced by causes other than turning is not carried out. Thus, this prevents unnatural variations of the vehicle attitude such as to disturb the riding comfort.

Figure 7:
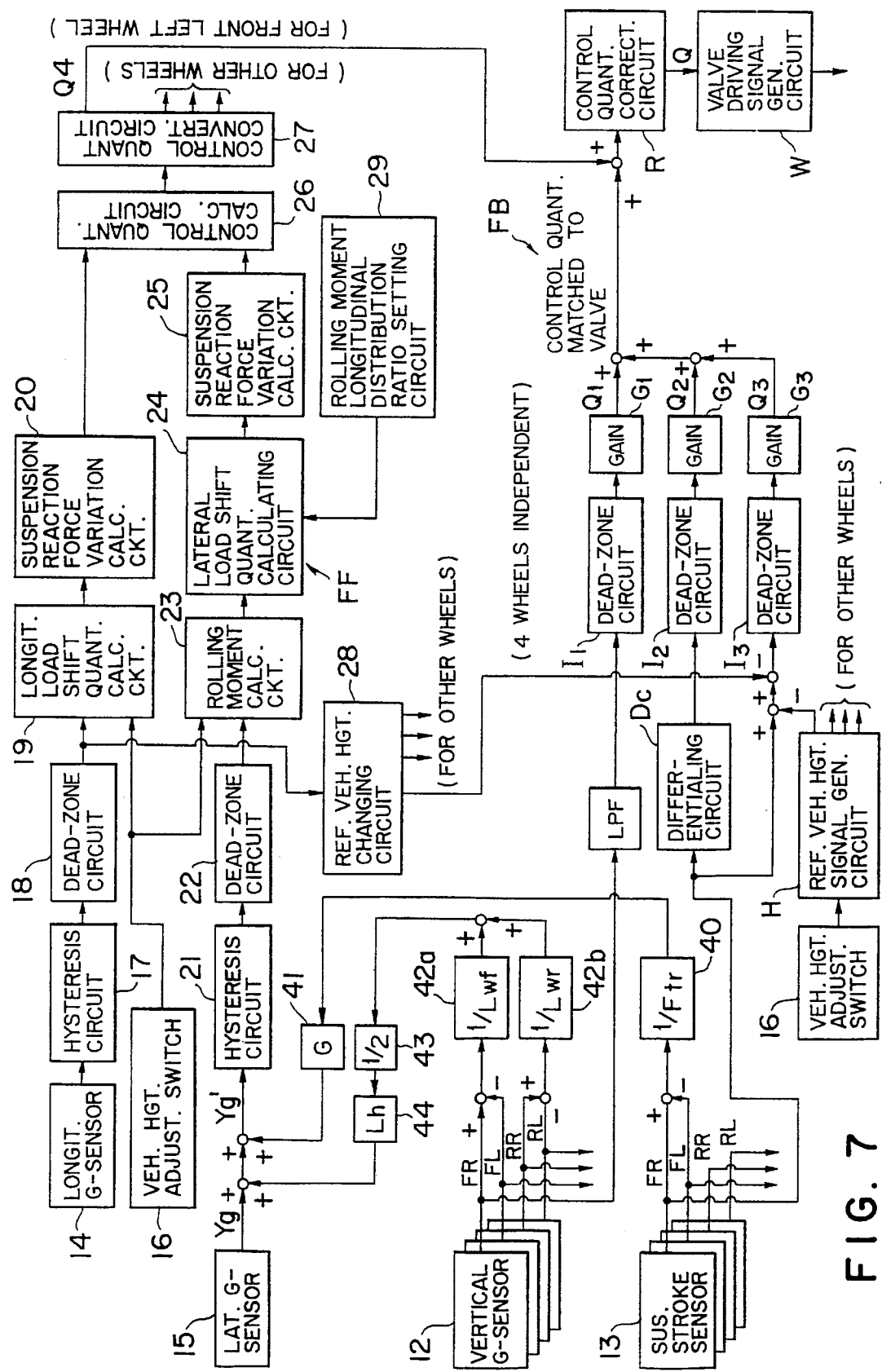
FIG. 7 is a block diagram of an active suspension control system using a lateral acceleration computing system.

FIG. 7 shows an active suspension control system to which the method of computation described above is applied. A major part of the control system shown in FIG. 7 is the same as the system shown in FIG. 3 so that common features with the system of FIG. 3 will not be described.

In the control system shown in FIG. 7, the rolling angle $\Phi$ of the vehicle is determined from the detection signal from the suspension stroke sensor 13, and the rolling angular acceleration is determined from the detection signal from the vertical G-sensor 12.

More specifically, the rolling angle $\Phi$ is expressed as the value obtained by dividing the difference between the left and right suspension strokes by the tread tr. The rolling angular acceleration is expressed as the value obtained by dividing the difference between the left and right vertical acceleration values of the vehicle by the span Lw in the lateral direction of the mounting positions of the left and right vertical G-sensors 12. Furthermore, in Equation (2) the rolling angle $\Phi$ is small. Therefore the relationship sin$\Phi$ =$\Phi$ can be used, and the above Equation (2) can be rewritten as Equation 3.

$$Yg' \approx Yg + \frac{G}{tr} (DL - DR) + \frac{Lh}{Lw} (\ddot{Z}L - \ddot{Z}R) \tag{3}$$

wherein: DL is the suspension stroke on the left side; DR is the suspension stroke on the right side; $\ddot{Z}$L is the vehicle body vertical acceleration on the left side; and $\ddot{Z}$R is the vehicle body vertical acceleration on the right side. The difference (DL–DR) may be the left-right suspension stroke difference of the front wheels, or it may be the suspension stroke difference of te rear wheels. It also may be the average value of the left-right suspension stroke difference at the front or at the rear. The difference ($\ddot{Z}$L–$\ddot{Z}$R) is the left-right vertical acceleration difference at the front or at the rear. It also may be the average value of the front and rear differences.

FIG. 7 indicates one example of derivation by the following process of a lateral acceleration signal Yg' suitable for control. The sine component of the gravitational acceleration produced by rolling is computed by dividing at a unit 40 the front left-right suspension stroke difference (DL–DR) by the front tread (Ftr) and multiplying at a unit 41 the resulting quotient by the gravitational acceleration G. The front left-right vertical acceleration difference and the rear left-right vertical acceleration difference are respectively divided at a unit 42a by the lateral-direction span Lwf of the mounting position of the front left-right vertical G-sensor 12 and divided at a unit 42b by the lateral-direction span Lwr of the mounting position of the rear left-right vertical G-sensor 12. The resulting two quotients are added, and the sum is divided by 2 at a unit 43 to obtain the average value. The average value is multiplied by the vertical distance Lh at a unit 44 to compute the roll oscillation component. Finally, the sine component of the gravitational acceleration and the rolling oscillation component determined by the computations described above are removed from the detected lateral acceleration value Yg from the lateral G-sensor 15 thereby to obtain the lateral acceleration signal Yg' suitable for control.

In the system illustrated in FIG. 7, four vertical G-sensors 12 are provided at front-rear, left-right positions. However, the present principle is applicable also to an active suspension system wherein only three vertical G-sensors are provided, for example, at the right-front, left-rear, and right-rear, and the vertical acceleration value of the remaining left-front is determined by computation from the detected signals of the three sensors used. In this case, the difference between the vertical acceleration values of the left-rear and right-rear positions is divided by the span Lwr, and the quotient is multiplied by Lh thereby to determine the rolling oscillation component. In the case of an active suspension system which has no vertical acceleration sensors, the rolling angular acceleration can be determined by differentiating twice the rolling angle Φ determined from the detected value of the suspension stroke sensors.

The details of the control modes of the control system shown in FIG. 7 will not be described herein since they are the same as those set forth hereinbefore with reference to FIG. 3.

It is to be understood that the method of computation may be applied to any other control systems that need lateral acceleration signals of a vehicle.

The active suspension control system shown in FIG. 7, using the mode of detection of lateral acceleration as described above, does not carry out surplus control based on detected lateral acceleration values from the lateral G-sensors generated in response to causes other than turning. Thus unnatural variations of vehicle attitude do not occur and the riding comfort is not spoiled. In the active suspension system shown, furthermore, quantities such as the rolling angle and the rolling angular acceleration used in the computation are determined from the detected signals of the suspension stroke sensors and the vertical acceleration sensors already installed in the vehicle. Therefore, special sensors for detecting the rolling angle and the rolling angular acceleration are unnecessary.

The present invention has been described as applied to an active suspension system using hydro-pneumatic suspensions. But it is possible to apply the present invention to an active suspension system using pneumatic suspensions, wherein air or other gases are charged and discharged into and out of the suspensions and assisting dampers are employed.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for controlling a plurality of active suspensions in a vehicle which is provided corresponding to each wheel of a vehicle, by charging and discharging a fluid to independently control height of said active suspensions to attain a reference vehicle height, the system comprising:

a longitudinal G-sensor mounted on said vehicle for detecting a longitudinal acceleration of said vehicle and for producing a longitudinal acceleration signal;

longitudinal hysteresis control means responsive to said longitudinal acceleration signal for attaining longitudinal control without fluctuation and for generating a longitudinal control signal;

a vertical height adjusting switch mounted on said vehicle for simultaneously changing a stroke by a same amount for each active suspension and for generating a signal of reference vehicle height for said each active suspension;

longitudinal variation calculating means responsive to said longitudinal control signal and said reference vehicle height signal for computing a quantity of said fluid in accordance with said longitudinal acceleration and for producing a first quantity signal;

a lateral G-sensor mounted on said vehicle for sensing a lateral acceleration of said vehicle and for generating a lateral acceleration signal;

lateral hysteresis control means responsive to said lateral acceleration signal for attaining lateral control without fluctuation and for generating a lateral control signal;

lateral variation calculating means responsive to said lateral control signal and said reference vehicle height signal for computing a quantity of said fluid in accordance with said lateral acceleration and for producing a second quantity signal;

control quantity calculating means responsive to said first and second quantity signals for calculating a control quantity and for generating a control quantity signal;

a vertical G-sensor provided for each active suspension to detect an acceleration in a vertical direction of said active suspension and to produce a vertical acceleration signal;

vertical acceleration control means responsive to said vertical acceleration signal for attaining vertical control without fluctuation and for generating a vertical control signal;

a suspension stroke sensor provided for each active suspension to detect a stroke of said active suspension and to generate a stroke signal, and stroke control means responsive to said stroke signal for generating a stroke control signal;

control means responsive to said vertical control signal and said stroke control signal to control said active suspension system;

means for supplying said control quantity signal to said active suspension system to reduce delay in vehicle attitude control by said active suspension system;

calculating means responsive to said longitudinal acceleration signal for computing a changing amount of vehicle height dependent on an actual amount of said longitudinal acceleration; and correcting means responsive to said calculating means for simultaneously lowering said reference vehicle height in a linearly proportional function of said actual amount so as to lower said reference vehicle height by a same displacement amount for said each active suspension, wherein said control means controls said active suspension system based on said lowered reference vehicle height.

2. The system according to claim 1, further comprising:

rolling oscillation calculating means responsive to said vertical acceleration signal from each of said active suspensions for calculating a rolling oscillation component and for outputting a oscillation component signal;

gravitational acceleration calculating means responsive to said stroke signal for calculating a gravitational acceleration and for outputting a gravitational acceleration signal; and said lateral hysteresis control means further responsive to said oscillation component signal and said gravitational acceleration signal for generating said lateral control signal.

3. The system according to claim 2, wherein said reference vertical height is increases as a proportional function of an absolute value of said actual amount of the longitudinal acceleration.

4. The system according to claim 1, wherein
said reference vertical height increases as a proportional function of an absolute value of said actual amount of the longitudinal acceleration.

5. A method for controlling an active suspension system in a vehicle having a plurality of wheels, an active suspension for each of said plurality of wheels for charging and discharging a fluid of said active suspension to independently control height of said active suspension to attain a reference vehicle height, comprising:

detecting a longitudinal acceleration of said vehicle using a longitudinal G-sensor mounted on said vehicle and producing a longitudinal acceleration signal, generating a longitudinal control signal responsive to said longitudinal acceleration signal for attaining longitudinal control without fluctuation, simultaneously changing a stroke of said active suspension by a same amount for said each active suspension using a vertical height adjusting switch mounted on said vehicle and generating a reference vehicle height signal, computing a quantity of said fluid in accordance with said longitudinal acceleration responsive to said longitudinal control signal and said reference vehicle height signal, and producing a first quantity signal, generating a lateral acceleration signal using a lateral G-sensor mounted on said vehicle for sensing a lateral acceleration of said vehicle, generating a lateral control signal responsive to said lateral acceleration signal for attaining lateral control without fluctuation, computing a quantity of said fluid in accordance with said lateral acceleration responsive to said lateral control signal and said reference vehicle height signal, and producing a second quantity signal, calculating a control quantity responsive to said first quantity signal and said second quantity signal, and generating a control quantity signal, detecting an acceleration in a vertical direction of said active suspension using a vertical G-sensor provided for each active suspension of said active suspension system, and producing a vertical acceleration signal, generating a vertical control signal responsive to said vertical acceleration signal for attaining vertical control without fluctuation, detecting a stroke of said active suspension using a suspension stroke sensor provided for each active suspension, generating a stroke signal based on said stroke, generating a stroke control signal based on said stroke signal for attaining stroke control without fluctuation, controlling the active suspension system responsive to said vertical control signal and said stroke control signal, supplying said control quantity signal to said active suspension system to reduce a delay in a vehicle attitude control by the active suspension system, detecting an actual amount of said longitudinal acceleration of said vehicle, calculating a changing amount of vehicle height dependent on said actual amount of said longitudinal acceleration, simultaneously lowering said reference vehicle height in a linearly proportional function of said actual amount responsive to the calculation of said changing amount so as to lower said reference vehicle height by a same displacement amount for said each active suspension, and producing a lowered reference vehicle height signal, and using said lowered reference vehicle height signal for controlling active suspension system.

6. The method according to claim 5, further comprising the steps of:

detecting lateral acceleration of the vehicle by the lateral G-sensor during rolling of the vehicle;

removing from the detected lateral acceleration a sine component, at a vehicle rolling angle, of gravitational acceleration generated due to the rolling of the vehicle and a rolling oscillation component at an installation position of said lateral G-sensor to obtain a value of lateral acceleration; and using the computed value as a lateral acceleration information for controlling the active suspensions.

7. The method according to claim 6, wherein:

said step of removing said sine component comprises:

obtaining a difference between strokes of left and right suspensions;

dividing the difference by a tread to obtain a quotient; and multiplying the quotient by gravitational acceleration.

8. The method according to claim 6, wherein:

the rolling oscillation component is computed by:

obtaining a difference between vertical accelerations at left and right sides of the vehicle;

dividing the difference by a lateral-direction span of said left and right sides to obtain a quotient; and multiplying the quotient by a vertical distance between a position where the lateral acceleration is detected and a position where a rolling center axis is.

9. The method according to claim 6, wherein:

said reference vertical height increases as a proportional function of an absolute value of said actual amount of the longitudinal acceleration.

10. The method according to claim 5, wherein:

said reference vertical height increases as a proportional function of an absolute value of said actual amount of the longitudinal acceleration.

* * * * *